Aug. 3, 1965  M. H. TUFT ETAL  3,198,550
OVERLOAD RELEASE FOR MOWERS
Filed Oct. 22, 1962  4 Sheets-Sheet 1

MILES H. TUFT
CHARLES J. BAYS
INVENTORS

BY

P. F. Wilder
ATTORNEY

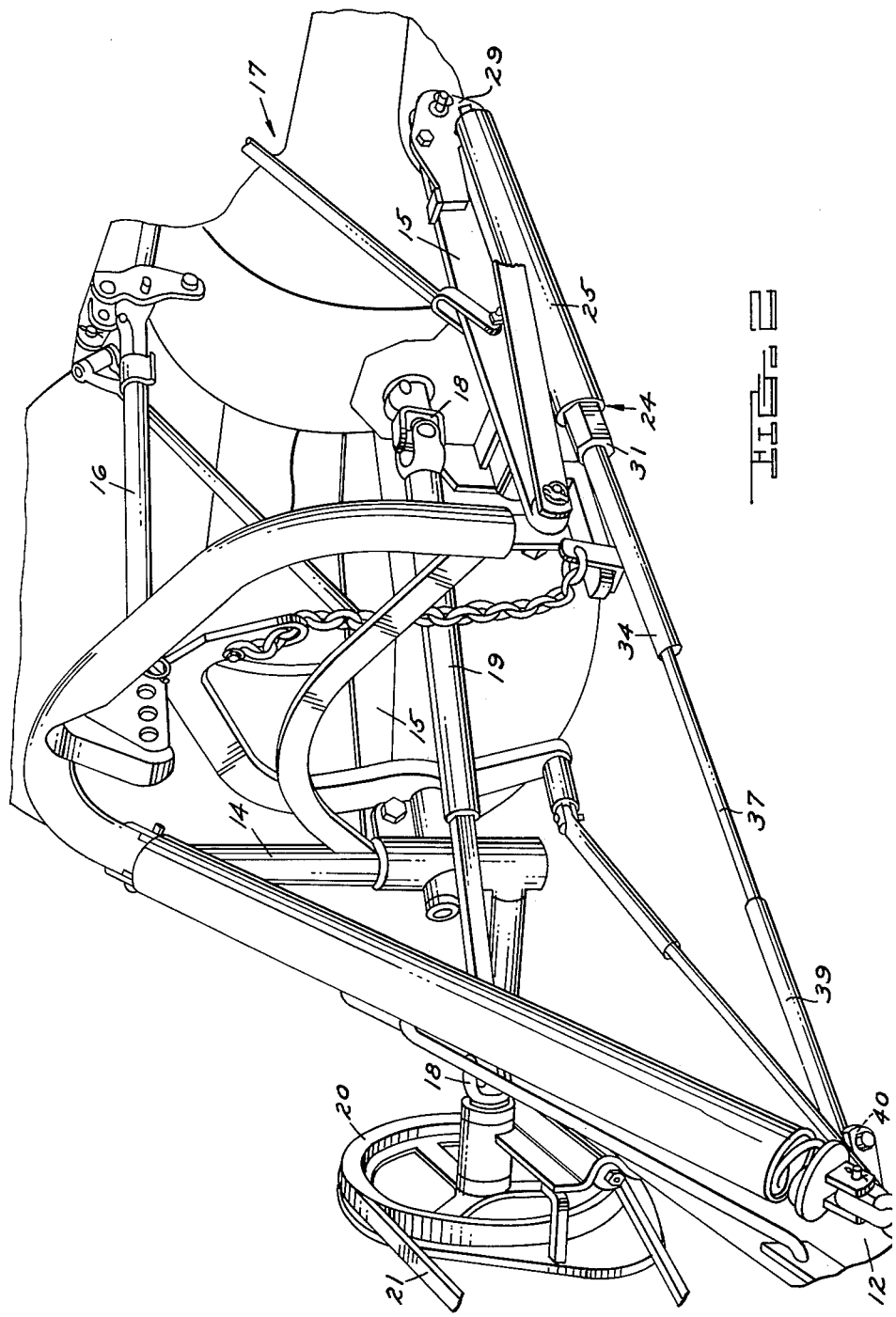

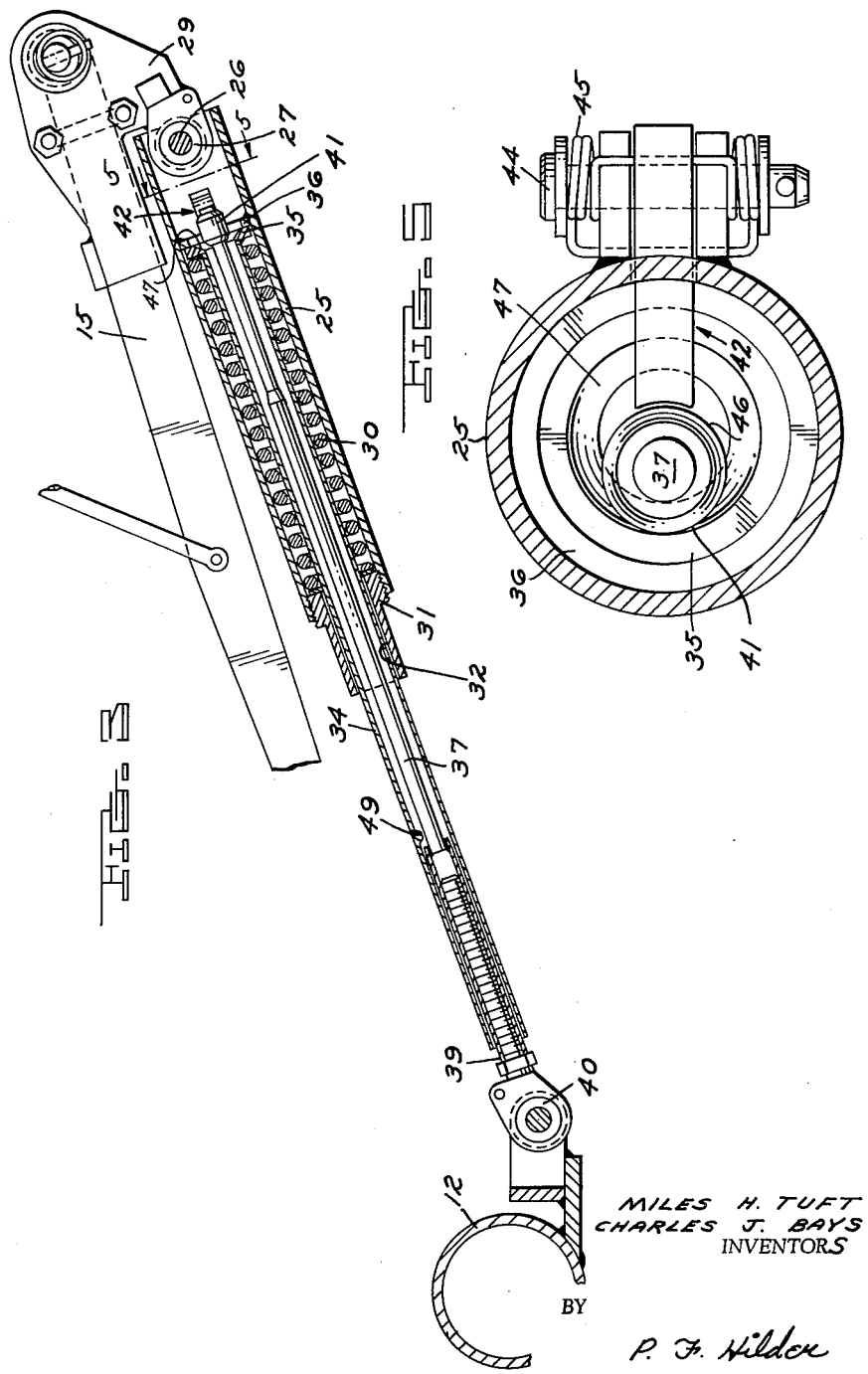

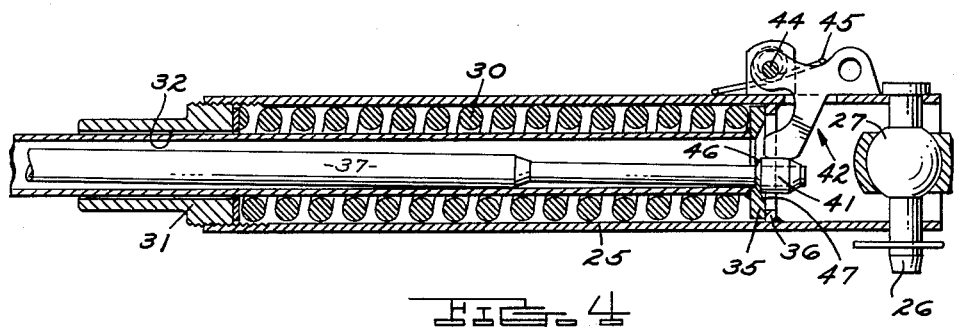
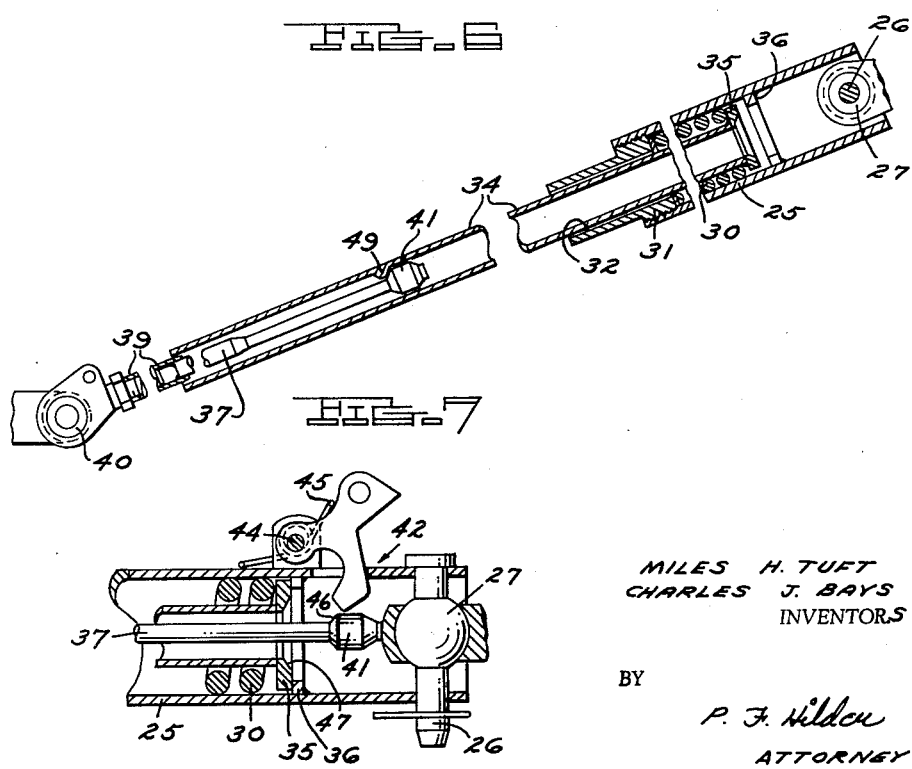

3,198,550
OVERLOAD RELEASE FOR MOWERS

Miles H. Tuft, Birmingham, and Charles J. Bays, Orchard Lake, Mich., assignors to Ford Motor Company, Dearborn, Mich., a corporation of Delaware
Filed Oct. 22, 1962, Ser. No. 232,135
4 Claims. (Cl. 280—449)

This invention relates to tractor-mounted mowers, and more particularly to devices for permitting the cutter bar to pivot rearwardly upon striking an obstruction in order to prevent damage to the mower.

Tractor-mounted mowers conventionally are provided with a cutter bar which is pivotally mounted on the mower frame for rearward swinging movement upon striking an obstruction. The cutter bar usually is held forward in operating position by a latch which releases upon the cutter bar being biased rearwardly with excessive force. These latches often rely on camming action displacing a spring-pressed lever.

The present invention comprises an improved mower latch and overload release mechanism wherein excessive force displacing the cutter bar rearwardly directly compresses a large spring, friction not substantially affecting operation of the latch. This same spring also serves to cushion the mower against loads which are insufficient to trip the latch and against excessive loads as the cutter bar swings back to its extreme rearward, tripped position. When restoring the mower after it has tripped, the spring compressed during tripping is not stressed, but only a locking lever is displaced against the bias of a light spring.

Among the objects of this invention are to provide a mower overload release mechanism that is simple and dependable in operation; that is easy to relatch; that cushions the mower against excessive loads; and generally to improve mechanisms of the type described.

Other objects and the nature and scope of the invention will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 2 is a side perspective view of the mower of FIGURE 1, the mower being shown in rearward, tripped position and the cutter bar and associated parts being broken away for convenience of illustration.

FIGURE 3 is a longitudinal axial section of the overload release mechanism.

FIGURE 4 is a longitudinal section similar to FIGURE 3 but taken along a longitudinal plane perpendicular to the plane of FIGURE 3.

FIGURE 5 is an enlarged cross section of the latch portion, taken on the line 5—5 of FIGURE 3.

FIGURE 6 is a longitudinal section of the overload release mechanism similar to FIGURE 3, showing the mechanism in rearward, tripped position.

FIGURE 7 is a longitudinal section of the latch portion similar to FIGURE 4, showing displacement of the latch in restoring the mechanism to operable position.

Figure 1:
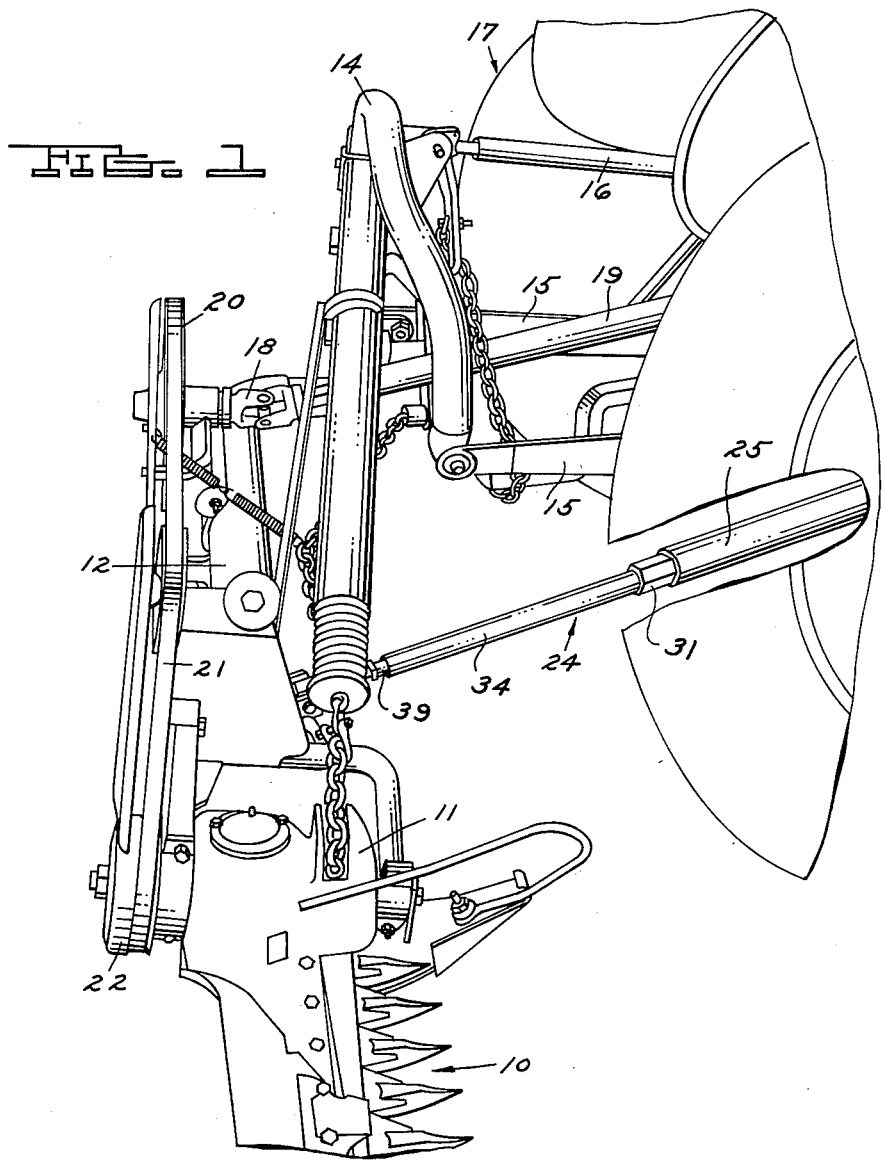
FIGURE 1 is a side perspective view of a mower incorporating a release according to the present invention, the mower being shown in operating position on a tractor and portions of the cutter bar being broken away for convenience of illustration.

Referring to FIGURES 1 and 2, the mower with which the overload release mechanism is shown is of the sickle bar type having a cutter bar 10 mounted on a drive mechanism 11 which, in turn, is carried by a support arm 12. The support arm 12 is mounted for rearward swinging movement on the frame 14 of the mower.

The mower frame 14 is carried by the lower links 15 and top link 16 of a 3-point hitch tractor, generally designated as 17. The mower is driven from the tractor through a drive shaft 19 and a pair of universal joints 18, one at each end of the drive shaft. The shaft 19 drives a sheave 20, which, through a belt 21, drives a sheave 22 on the drive mechanism 11. The universal joints permit the support arm 12 to swing rearwardly and permit the mower to be raised and lowered, as well as providing for misalignment of the elements of the drive.

The cutter bar 10, support arm 12 and associated parts normally are held in forward, operating position by an overload release mechanism 24 extending between the tractor and the support arm 12. Preferably the cylindrical body 25 of the overload release has a pin 26 which is received within a ball 27 retained in an anchor 29 clamped to the forward end of the right hand lower link 15 of the tractor.

A helical compression spring 30 is telescopically received within the body 25, one end of the spring being held by an abutment 31 having a central bore 32.

A tubular guide 34 is telescoped within the spring 30, one end of the guide 34 projecting through the bore 32 for sliding movement therein. The other end of the guide 34 is provided with a radially extending flange 35 engaged by the spring 30 and pressed against a stop 36 secured within the body 25.

A rod 37 extends within the guide 34, one end 39 being connected with the cutter bar support arm 12 by a ball joint 40 to provide limited universal movement.

The other end of the rod 37 is provided with a radially extending head 41. The head 41 is smaller in diameter than the interior of the guide 34 to provide for longitudinal movement of the rod within the guide.

A latch 42 is provided on the body 25 to radially displace the head 41 of the rod and cause the head to engage the flange 35 at one end of the guide (see FIGURES 4 and 5). The latch 42 may be pivotally mounted on the body 25 for swinging movement about a pin 44 mounted on the body. A spring 45 biases the latch into the position indicated in FIGURES 4 and 5.

Preferably, the underside of the head 41 is provided with a conical surface 46 which cooperates with a conical surface 47 of similar inclination on the confronting surface of the flange 35 so that tension applied to the overload release by the ball joints 27 and 40 tends to center the rod 37 within the guide 34.

In operation, tension on the overload release mechanism forces the guide 34 to move to the left as viewed in FIGURE 4, compressing the spring 30 and permitting the rod to move to the left a like amount. The rod is constrained against axial movement by the latch 42. Although the force exerted on the overload release mechanism may be insufficient to cause tripping in release, the spring 30 does serve to permit the support arm 12 and cutter bar to swing rearwardly a slight distance and thus cushion the mechanism against the effect of impacts insufficient to cause tripping of the overload release.

Upon a force being impressed on the overload release of sufficient magnitude to compress the spring 30 a sufficient distance to permit the head 41 to be withdrawn from contact with the latch 42, the rod 37 will immediately move axially due to the camming action of the engaged surfaces 46 and 47. As soon as the head 41 of the rod moves off the surface 47 of the flange 35, the rod is withdrawn a substantial distance along the guide 34, releasing the support arm 12 and cutter bar for rearward swinging movement without stressing the spring 30.

The overload release is extended by withdrawing movement of the rod 37 from the guide 34 until the head 41 of the rod strikes against a projection or stop 49 on the interior of the guide. Upon the head of the rod 37 striking this projection, further withdrawal of the rod from the guide is prevented and the guide and rod are again biased by spring 30. The spring 30, which has returned the flange 35 of the guide against the stop 36 again is compressed slightly to cushion the impact of the head of the rod on the stop by permitting the guide 34 to move slightly to the left as viewed in the drawings.

To restore the cutter bar 13 to operative position, the cutter bar may be swung forwardly by hand or by reversing the tractor with the cutter bar lowered to the ground. Forward swinging of the support arm cutter bar forces the rod 37 into its forward position, the head 41 of the rod striking the latch 42 and rotating it about the pin 44 sufficiently to permit the head to again over-ride the confronting surface of the flange 35 (FIGURE 7).

As soon as the rod 37 has moved forwardly sufficiently, the spring-pressed latch 42 displaces the rod radially and resumes the position indicated in FIGURES 4 and 5 beside the head of the rod. Inasmuch as the spring 45 is not deflected to release the rod 37, it need only be sufficiently strong to prevent accidental release of the rod, and only a relatively light force is required to reset the release mechanism.

What is claimed as new is:

1. An extensible link for a tractor-mounted mower, said link extending between the tractor and a portion of the mower adapted to swing rearwardly to prevent damage due to overload, the link comprising two telescoped link sections, a helical spring adapted to bias the sections into telescoped relation and to be compressed in 1:1 ratio by extension of the link, one of the link sections extending generally axially of the spring and having a radially enlarged end laterally displaceable into operative engagement with to be biased by an end of the spring, and means for laterally displacing the link section into spring-biased position, the link-displacing means releasing the link to permit it to move centrally of the spring out of spring-biased position upon the spring becoming compressed a predetermined amount to permit the link to extend without further compression of the spring.

2. An extensible link as claimed in claim 1, in which the link section displacing means overlaps an end of the displaceable link section for a short distance, withdrawal of the link section from overlapping relation with said means releasing the link section for movement centrally of the spring.

3. An overload releasable breakback link for a tractor-mounted mower, said link extending between the tractor and a portion of the mower adapted to swing rearwardly to prevent damage due to overload, the link comprising an elongated body having a first end attached to one of the units, a rod telescoped within the body and attached to the other unit, a tubular guide member mounted for telescopic movement within the body and having an enlarged end, a compression spring extending between the enlarged end of the guide member and the other end of the body and biasing the guide member towards said first end, the rod being telescopically received within the body and guide member and having an enlarged end extending through a central opening in the enlarged end of the guide member, the opening in the guide member being larger than said enlargement of the rod, and means on said body displacing the end of the rod laterally to engage the margin of the opening in the guide member, whereby tension on the link tends to displace the guide member in a direction to compress the spring, compression of the spring more than a predetermined amount withdrawing the rod from engagement with the rod-displacing means to permit the rod to move centrally of the spring, thereby releasing the inter-engaged portions of the rod and guide member to permit the link to extend.

4. An overload releasable breakback link for a tractor-mounted mower, said link extending between the tractor and a portion of the mower adapted to swing rearwardly to prevent damage due to overload, the link comprising an elongated body having a first end attached to the tractor, a rod telescoped within the body and attached to the mower, a tubular guide member mounted for telescopic movement within the body and having an enlarged end, a compression spring surrounding the guide member and extending between the enlarged end of the guide member and the other end of the body and biasing the guide member towards said first end, the rod being telescopically received within the body and guide member and having an enlarged end extending through a central opening in the enlarged end of the guide member, the opening in the guide member being larger than said enlargement of the rod, and means on said body displacing the end of the rod laterally to engage the margin of the opening in the guide member, whereby tension on the link tends to displace the guide member in a direction to compress the spring, compression of the spring more than a predetermined amount withdrawing the rod from engagement with the rod-displacing means to permit the rod to move centrally of the spring, thereby releasing the inter-engaged portions of the rod and guide member to permit the link to extend.

References Cited by the Examiner

UNITED STATES PATENTS

| 2,311,826 | 2/43 | Grasswick | 180—14.5 |
| 2,502,805 | 4/50 | Spurlin | 280—450 X |
| 2,613,947 | 10/52 | Jedrzykowski | 280—450 |

A. HARRY LEVY, *Primary Examiner.*